(12) United States Patent
Kato et al.

(10) Patent No.: US 8,971,150 B2
(45) Date of Patent: Mar. 3, 2015

(54) METHOD FOR MEASURING SEA WAVES BY MEANS OF ULTRASONIC WAVES, AS WELL AS SEA WAVE MEASURING SYSTEM

(75) Inventors: Teruyuki Kato, Tokyo (JP); Yukihiro Terada, Nankoku (JP); Toshihide Miyake, Osaka (JP); Haruhiko Yoshida, Osaka (JP)

(73) Assignees: Hitachi Zosen Corporation, Osaka (JP); The University of Tokyo, Tokyo (JP); Institute of National Colleges of Technology, Japan, Tokyo (JP)

( * ) Notice: Subject to any disclaimer, the term of this patent is extended or adjusted under 35 U.S.C. 154(b) by 597 days.

(21) Appl. No.: 13/390,696

(22) PCT Filed: Jul. 30, 2010

(86) PCT No.: PCT/JP2010/062867
§ 371 (c)(1),
(2), (4) Date: Feb. 16, 2012

(87) PCT Pub. No.: WO2011/021490
PCT Pub. Date: Feb. 24, 2011

(65) Prior Publication Data
US 2012/0147706 A1 Jun. 14, 2012

(30) Foreign Application Priority Data
Aug. 21, 2009 (JP) ................. 2009-191513

(51) Int. Cl.
*G01C 13/00* (2006.01)
*G01S 5/30* (2006.01)
(Continued)

(52) U.S. Cl.
CPC ............. *G01C 13/004* (2013.01); *G01S 5/30* (2013.01); *G01S 15/74* (2013.01); *G01S 15/874* (2013.01); *G01S 15/88* (2013.01); *G01C 13/002* (2013.01); *G01S 5/0009* (2013.01); *G01S 7/003* (2013.01)
USPC ........................... 367/118; 367/127; 367/129

(58) Field of Classification Search
CPC ............... G01C 13/00–13/008; G01S 15/88; G01S 5/0009; G01S 7/003
USPC ............. 367/118–128, 99; 73/170.29, 170.31
See application file for complete search history.

(56) References Cited

U.S. PATENT DOCUMENTS 4,308,749 A * 1/1982 Clavelloux et al. ........ 73/170.34
4,311,045 A * 1/1982 Clavelloux et al. ........ 73/170.34
(Continued)

FOREIGN PATENT DOCUMENTS

| CL | 200402801 | 8/2005 | ............. G09B 23/06 |
| JP | 59-221611 | 12/1984 | ............. G01C 13/00 |

(Continued)

OTHER PUBLICATIONS

Int'l Search Report from corresponding hit'l Patent Application No. PCT/JP2010/062867, 2 Pages.
(Continued)

*Primary Examiner* — Isam Alsomiri
*Assistant Examiner* — Hovhannes Baghdasaryan
(74) *Attorney, Agent, or Firm* — Kusner & Jaffe

(57) ABSTRACT

A method for measuring sea waves includes: transmitting ultrasonic waves from an ultrasonic transmitter 2 provided on a buoy 1 into the sea, and receiving the ultrasonic waves from three transponders 3 on the seabed together with the time signals; detecting distances between the transponders 3 and the ultrasonic transmitter 2 based on the propagation time of the ultrasonic waves; high-pass filtering the distance data to extract a short-term fluctuation component; preparing and solving linear equations to determine the displacement in the height direction of the short-term fluctuation component and obtain a wave height.

6 Claims, 6 Drawing Sheets

(51) Int. Cl.
*G01S 15/74* (2006.01)
*G01S 15/87* (2006.01)
*G01S 15/88* (2006.01)
*G01S 5/00* (2006.01)
*G01S 7/00* (2006.01)

(56) References Cited

U.S. PATENT DOCUMENTS

| | | | |
|---|---|---|---|
| 6,847,326 B2 | 1/2005 | Harigae et al. | 342/357.07 |
| 8,423,487 B1 * | 4/2013 | Rubin | 706/12 |
| 2012/0147706 A1 | 6/2012 | Kato et al. | 367/127 |

FOREIGN PATENT DOCUMENTS

| | | | | |
|---|---|---|---|---|
| JP | 2001-337157 | 12/2001 | | G01S 5/30 |
| JP | 2002-365364 | 12/2002 | | G01S 15/06 |
| JP | 2008-002976 | 1/2008 | | G01C 13/00 |
| WO | WO 2011/021490 | 2/2011 | | G01S 15/74 |

OTHER PUBLICATIONS

Office Action from corresponding Chilean Patent Application No. 154-12, issued on Nov. 15, 2013, 13 Pages (including English translation).

* cited by examiner

METHOD FOR MEASURING SEA WAVES BY MEANS OF ULTRASONIC WAVES, AS WELL AS SEA WAVE MEASURING SYSTEM

TECHNICAL FIELD

The present invention relates to a method for measuring sea waves by means of ultrasonic waves and a sea wave measuring system.

BACKGROUND ART

In the steady observation, that is, measurement of sea waves, an under-water pressure type wave meter has been generally used for measuring pressure fluctuations at the seabed.

The under-water pressure type wave meter can be used in shallow waters but has a limited use in very deep waters with a lower sensitivity to short-period waves since the movement of water particles due to sea surface waves does not reach the seabed.

Thus, when the under-water pressure type wave meter is used, observed waveforms are obtained through a low-pass filter, inevitably reducing the accuracy and reliability of observation data.

Meanwhile, an ultrasonic wave meter can directly obtain waveforms on the sea surface as compared to the under-water pressure type wave meter, and has been widely used on the coasts all over the country.

The ultrasonic wave meter observes sea surface waves by transmitting sharp ultrasonic pulse beams toward the sea surface from a transmitter/receiver on the seabed, receiving reflected waves from the sea surface, and continuously recording the round-trip propagation time (corresponding to the sea surface level) of the ultrasonic pulse (see, for example, "Enganharo Kaisho Kansoku Deta no Kaiseki Katsuyo nikansuru Kaisetsusho (Manual for Analysis and Utilization of Coastal Waves/Oceanographic Observatory Data) (pages 3 to 4), published by Coastal Development Institute of Technology, in August of 2000").

SUMMARY OF INVENTION

Technical Problem

As described above, the ultrasonic wave meter of the related art transmits ultrasonic waves from the transmitter/receiver on the seabed toward the sea surface, and receives the reflected waves from the sea surface. However, when waves are high, the sea surface is disturbed and large amounts of air bubbles are trapped by breaking waves, so that the ultrasonic waves are absorbed or scattered, thereby reducing the measurement accuracy or producing an unmeasurable state in some cases.

An object of the present invention is to provide a method for measuring sea waves by means of ultrasonic waves and a sea wave measuring system which can accurately measure even high waves.

Solution to Problem

In order to solve the problem, a first aspect of the present invention is a method for measuring wave heights in predetermined waters by detecting a fluctuation of a floating body on the sea surface, the method including: receiving ultrasonic waves emitted from at least three ultrasonic transmitters on or in the vicinity of the seabed below the floating body moored on the sea surface of the predetermined waters with an ultrasonic receiver provided below the sea surface on the floating body; detecting distances between the ultrasonic transmitters and the ultrasonic receiver based on propagation time since the ultrasonic waves are emitted from the ultrasonic transmitters until the ultrasonic waves are received; high-pass filtering the distance data to extract short-term fluctuation components; and preparing linear equations with three unknowns for the respective ultrasonic transmitters such that a formula having as unknowns displacements of three-dimensional coordinate axes of the ultrasonic receiver is equal to the extracted short-term fluctuation component, the three-dimensional coordinate axes having as coefficients the azimuth and depression of the ultrasonic receiver relative to the ultrasonic transmitter, and solving the simultaneous linear equations with three unknowns to determine at least the displacement in the height direction of the short-term fluctuation component and obtain a wave height.

A second aspect of the present invention is a sea wave measuring system for measuring sea waves in predetermined waters by detecting a fluctuation of a floating body on the sea surface, the system including: the floating body moored on the sea surface in the predetermined waters; ultrasonic transmitters placed in at least three positions on or in the vicinity of the seabed below the floating body; an ultrasonic receiver capable of receiving ultrasonic waves from the ultrasonic transmitters, the ultrasonic receiver being provided below the sea surface on the floating body; and a sea wave measuring device for measuring wave heights by detecting distances between the ultrasonic transmitters and the ultrasonic receiver based on propagation time since the ultrasonic waves are emitted from the ultrasonic transmitters until the ultrasonic waves are received, wherein the sea wave measuring device includes: a distance calculator for calculating the distances between the ultrasonic transmitters and the ultrasonic receiver based on the propagation time since the ultrasonic waves are emitted from the ultrasonic transmitters until the ultrasonic waves are received; a short-term fluctuation component extraction part for extracting short-term fluctuation components by high-pass filtering the distance data determined by the distance calculator; and a short-term fluctuation component calculator for preparing linear equations with three unknowns for the respective ultrasonic transmitters such that a formula having as unknowns displacements of three-dimensional coordinate axes of the ultrasonic receiver is equal to the short-term fluctuation component extracted by the short-term fluctuation component extraction part, the three-dimensional coordinate axes having as coefficients the azimuth and depression of the ultrasonic receiver relative to the ultrasonic transmitter, and solving the linear equations with three unknowns to determine at least the displacement in the height direction of the short-term fluctuation component and obtain a wave height.

A third aspect of the present invention is a method for measuring wave heights in predetermined waters by detecting a fluctuation of a floating body on the sea surface, the method including: emitting ultrasonic waves into the sea from an ultrasonic transmitter/receiver provided below the sea surface on the floating body moored on the sea surface in the predetermined waters, and receiving the ultrasonic waves from at least three sound wave relay devices placed on or in the vicinity of the seabed below the floating body; detecting distances between the sound wave relay devices and the ultrasonic transmitter/receiver based on round-trip propagation time since the ultrasonic waves are emitted from the ultrasonic transmitter/receiver until the ultrasonic waves are received; high-pass filtering the distance data to extract short-term fluctuation components; and preparing linear equations with three unknowns for the respective sound wave relay devices such that a formula having as unknowns displacements of three-dimensional coordinate axes of the ultrasonic transmitter/receiver is equal to the extracted short-term fluctuation component, the three-dimensional coordinate axes having as coefficients the azimuth and depression of the ultrasonic transmitter/receiver relative to the sound wave relay device, and solving the linear equations with three unknowns to determine at least the displacement in the height direction of the short-term fluctuation component and obtain a wave height.

A fourth aspect of the present invention is a sea wave measuring system for measuring sea waves in predetermined waters by detecting a fluctuation of a floating body on the sea surface, the system including: the floating body moored on the sea surface in the predetermined waters; an ultrasonic transmitter/receiver capable of emitting and receiving ultrasonic waves into and from the sea, the ultrasonic transmitter/receiver being provided below the sea surface on the floating body; at least three sound wave relay devices for receiving and emitting the ultrasonic waves from the ultrasonic transmitter/receiver, the sound wave relay devices being placed on or in the vicinity of the seabed below the floating body; and a sea wave measuring device for measuring wave heights by detecting distances between the sound wave relay devices and the ultrasonic transmitter/receiver based on round-trip propagation time since the ultrasonic waves are emitted from the ultrasonic transmitter/receiver until the ultrasonic waves are received, wherein the sea wave measuring device includes: a distance calculator for calculating the distances between the sound wave relay devices and the ultrasonic transmitter/receiver based on the round-trip propagation time since the ultrasonic waves are emitted from the ultrasonic transmitter/receiver until the ultrasonic waves are received; a short-term fluctuation component extraction part for extracting short-term fluctuation components by high-pass filtering the distance data determined by the distance calculator; and a short-term fluctuation component calculator for preparing linear equations with three unknowns for the respective sound wave relay devices such that a formula having as unknowns displacements of three-dimensional coordinate axes of the ultrasonic transmitter/receiver is equal to the short-term fluctuation component extracted by the short-term fluctuation component extraction part, the three-dimensional coordinate axes having as coefficients the azimuth and depression of the ultrasonic transmitter/receiver relative to the sound wave relay device, and solving the linear equations with three unknowns to determine at least the displacement in the height direction of the short-term fluctuation component and obtain a wave height.

A fifth aspect of the present invention is a method for measuring wave heights in predetermined waters by detecting a fluctuation of a floating body on the sea surface, the method including: emitting ultrasonic waves from an ultrasonic transmitter/receiver provided below the sea surface on the floating body moored on the sea surface in the predetermined waters to at least three sound wave relay devices placed on or in the vicinity of the seabed below the floating body; detecting distances between the sound wave relay devices and the ultrasonic transmitter/receiver based on propagation time from the sound wave relay device by receiving the ultrasonic waves relayed by the sound wave relay device and relay time with the ultrasonic transmitter/receiver; high-pass filtering the distance data to extract short-term fluctuation components; and preparing linear equations with three unknowns for the respective sound wave relay devices such that a formula having as unknowns displacements of three-dimensional coordinate axes of the ultrasonic transmitter/receiver is equal to the short-term fluctuation component extracted by the short-term fluctuation component extraction part, the three-dimensional axes having as coefficients the azimuth and depression of the ultrasonic transmitter/receiver relative to the sound wave relay device, and solving the linear equations with three unknowns to determine at least the displacement in the height direction of the short-term fluctuation component and obtain a wave height.

A sixth aspect of the present invention is a sea wave measuring system for measuring sea waves in predetermined waters by detecting a fluctuation of a floating body moored on the sea surface, the system including: the floating body moored on the sea surface in the predetermined waters; an ultrasonic transmitter/receiver capable of emitting and receiving ultrasonic waves into and from the sea, the ultrasonic transmitter/receiver being provided below the sea surface on the floating body; at least three sound wave relay devices for relaying the ultrasonic waves from the ultrasonic transmitter/receiver and emitting the ultrasonic waves with relay time, the sound wave relay devices being placed below the floating body below the sea surface; and a sea wave measuring device for measuring wave heights by detecting distances between the sound wave relay devices and the ultrasonic transmitter/receiver based on propagation time since the ultrasonic waves are emitted from the sound wave relay device until the ultrasonic waves are received, wherein the sea wave measuring device includes: a distance calculator for determining the distances between the sound wave relay devices and the ultrasonic transmitter/receiver based on the propagation time from the sound wave relay device by receiving the ultrasonic waves from the sound wave relay device and the relay time; a short-term fluctuation component extraction part for extracting short-term fluctuation components by high-pass filtering the distance data determined by the distance calculator; and a short-term fluctuation component calculator for preparing linear equations with three unknowns for the respective sound wave relay devices such that a formula having as unknowns displacements of three-dimensional coordinate axes of the ultrasonic transmitter/receiver is equal to the short-term fluctuation component extracted by the short-term fluctuation component extraction part, the three-dimensional coordinate axes having as coefficients the azimuth and depression of the ultrasonic transmitter/receiver relative to the sound wave relay device, and solving the linear equations with three unknowns to determine at least the displacement in the height direction of the short-term fluctuation component and obtain a wave height.

Advantageous Effects of Invention

According to the first and second aspects, ultrasonic waves are emitted from the at least three ultrasonic transmitters on or in the vicinity of the seabed toward the sea surface, and the ultrasonic waves are received by the ultrasonic receiver provided below the sea surface on the floating body. When the one-way propagation time of the ultrasonic waves is detected to measure the distances between the floating body and the ultrasonic transmitters, wave heights are measured by high-pass filtering the measured distance data, that is, removing the long-term fluctuation components to extract only the short-term fluctuation components not containing the influence of seawater. Thus, the measurement is not affected by the sea surface as compared to the related art in which ultrasonic waves are transmitted from the transmitter/receiver on the seabed toward the sea surface and are reflected by the sea surface to measure wave heights. That is, even when waves are high, the wave heights can be accurately measured, so that an unmeasurable state is hardly produced.

According to the third and fourth aspects, ultrasonic waves are transmitted into the sea from the ultrasonic transmitter/receiver provided below the sea surface on the floating body on the sea surface, and the ultrasonic waves are received by the ultrasonic transmitter/receiver from the sound wave relay device on or in the vicinity of the seabed. When the round-trip propagation time of the ultrasonic waves is detected to measure the distance between the floating body and the sound wave relay device, wave heights are measured by high-pass filtering the measured distance data, that is, removing the long-term fluctuation components to extract only the short-term fluctuation components not containing the influence of seawater. Thus, the measurement is not affected by the sea surface as compared to the related art in which ultrasonic waves are transmitted from the ultrasonic transmitter/receiver on the seabed toward the sea surface and are reflected by the sea surface to measure wave heights. That is, even when waves are high, the wave heights can be accurately measured, so that an unmeasurable state is hardly produced.

According to the fifth and sixth aspects, ultrasonic waves are transmitted into the sea from below the sea surface from the floating body on the sea surface, and the ultrasonic waves are received with the time of emission by the ultrasonic transmitter/receiver of the floating body from the at least three ultrasonic relay devices on or in the vicinity of the seabed. When the one-way propagation time of the ultrasonic waves is detected to measure the distances between the floating body and the ultrasonic relay devices, wave heights are measured by high-pass filtering the measured distance data, that is, removing the long-term fluctuation components to extract only the short-term fluctuation components not containing the influence of seawater. Thus, the measurement is not affected by the sea surface as compared to the related art in which ultrasonic waves are transmitted from the ultrasonic transmitter/receiver on the seabed toward the sea surface and are reflected by the sea surface to measure wave heights. That is, even when waves are high, the wave heights can be accurately measured, so that an unmeasurable state is hardly produced.

DESCRIPTION OF EMBODIMENTS

First Embodiment

The following will describe a method for measuring sea waves using ultrasonic waves and a sea wave measuring system according to a first embodiment of the present invention.

In the first embodiment, wave heights especially in very deep waters, in addition to coastal waters, are measured using ultrasonic waves emitted (transmitted) into water.

Figure 1:
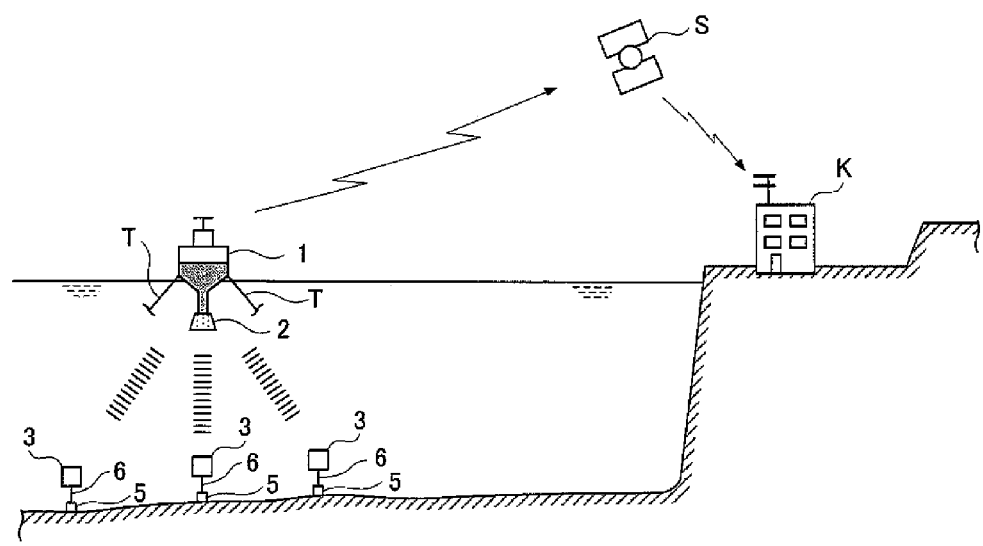
FIG. 1 schematically shows the overall configuration of a sea wave measuring system according to a first embodiment of the present invention.
Figure 2:
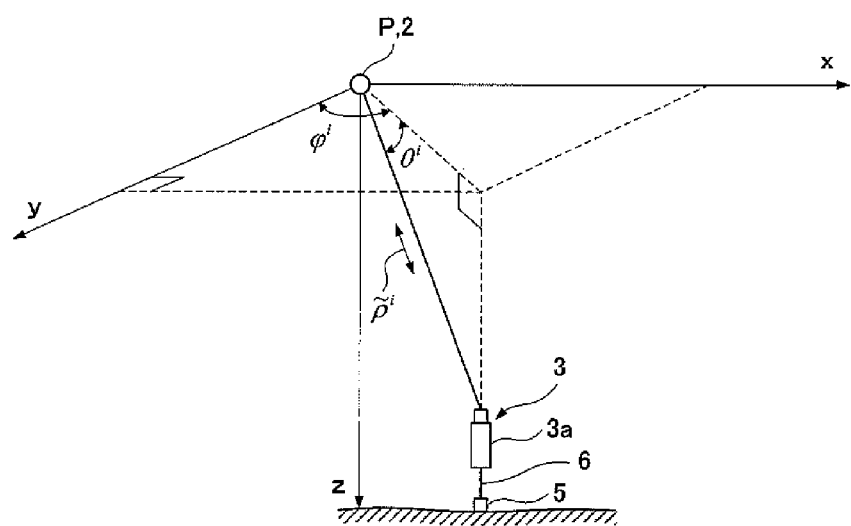
FIG. 2 is a perspective view of a coordinate system for illustrating the measurement principle of the sea wave measuring system.
Figure 3:
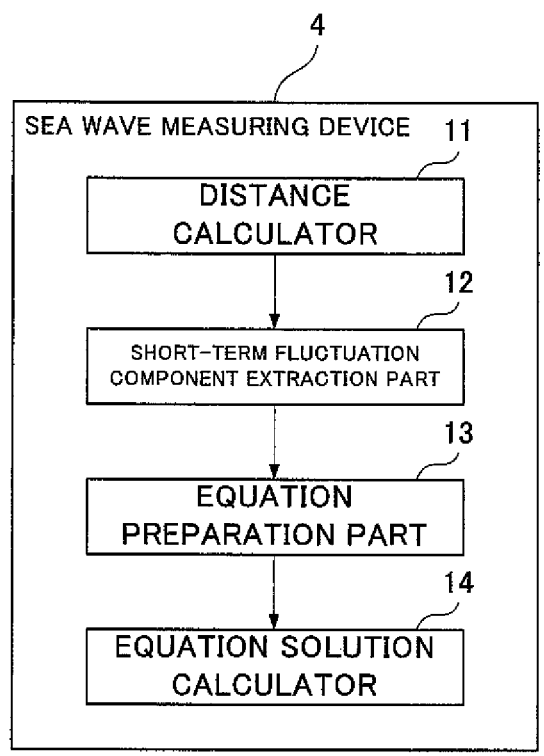
FIG. 3 is a block diagram showing the schematic configuration of a sea wave measuring device in the sea wave measuring system.

The sea wave measuring system, as shown in FIGS. 1 to 3, includes: a buoy 1 which is moored by mooring cables T, floats on the sea surface in very deep waters, and is provided with an ultrasonic receiver 2 capable of receiving ultrasonic waves; at least three ultrasonic transmitters 3 which are placed in the vicinity of the seabed substantially directly below the buoy 1 to emit ultrasonic waves toward the sea surface; and a sea wave measuring device 4 for measuring wave heights by receiving the ultrasonic waves emitted from the ultrasonic transmitters 3 with the ultrasonic receiver 2 to detect the three-dimensional position of the buoy 1. The ultrasonic receiver 2 is provided on the lower end of the buoy 1, that is, undersea. Further, a cylindrical container body 3a of the ultrasonic transmitter 3 includes a transmitter body for emitting ultrasonic waves therein.

The ultrasonic transmitters 3 are movably moored through cables 6 by, for example, anchors 5 dropped on the seabed, but may be seen to remain still, that is, fixed since there are few currents in the vicinity of the seabed in very deep waters. Further, the ultrasonic transmitters 3 may be dropped or installed directly on the seabed.

The following will describe the sea wave measuring device 4.

The sea wave measuring device 4 measures wave heights by continuously measuring distances between the ultrasonic receiver 2 of the buoy 1 and the three ultrasonic transmitters 3 to detect fluctuations of the buoy 1, that is, displacements of the sea surface. Further, the sea wave measuring device 4 can determine wave heights anywhere by means of calculations with only data of ultrasonic waves from the ultrasonic transmitters 3. Thus, data received by the ultrasonic receiver 2, for example, time data is transmitted to a base station K on the shore through a satellite S or the like, so that wave heights are determined by the sea wave measuring device 4 usually placed in the base station K. As a matter of course, the sea wave measuring device 4 may be provided on the buoy 1, and wave heights determined by the sea wave measuring device 4 may be transmitted to a predetermined place such as the base station K via the satellite S.

First, the principle for detecting wave heights using ultrasonic waves will be briefly described.

In the method for measuring wave heights according to the present invention, the three-dimensional position of the buoy 1 floating on the sea surface is measured to measure displacements (variations) of the sea level. In brief, displacements of the buoy 1 are detected relative to the ultrasonic transmitters 3. In the detection, distances between the buoy 1 and the ultrasonic transmitters 3 are measured using ultrasonic waves. Specifically, distances between the ultrasonic receiver 2 of the buoy 1 and the ultrasonic transmitters 3 placed on the seabed (or in the vicinity of the seabed) in very deep waters are measured using the propagation time of ultrasonic waves. The measurement is significantly affected by seawater. In detail, the velocities of ultrasonic waves are largely varied by the temperature, pressure, and salinity level of seawater. Thus, these fluctuation components have to be removed.

In the first embodiment, the influence by seawater is removed, noticing that the time for the change of the distributions of the temperature, pressure, and salinity level of the seawater between the ultrasonic receiver 2 and the ultrasonic transmitters 3 is long, in other words, the time for the change is far longer than the cycle of vertical motion of the buoy due to sea waves.

Specifically, the displacement (fluctuation) of the buoy contains a long-term fluctuation component due to the influence of seawater and a short-term fluctuation component due to sea waves. Thus, the wave height corresponding to the short-term fluctuation component can be determined by subtracting the long-term fluctuation component from the displacement of the buoy.

The steps of determining wave heights will be described below.

Herein, the installation position of the ultrasonic receiver 2 provided in a predetermined position of the buoy 1 is referred to as an observation point P.

First, when a distance between the observation point P and the ultrasonic transmitter 3 (i; i=1, 2, 3) is represented by $\rho^i$, the long-term fluctuation component is represented by $\rho^i 1$, and the short-term fluctuation component is represented by $\rho^i 2$, the following formula (1) is established. In the formula, the long-term fluctuation component ($\rho^i 1$) is represented by $\hat{\rho}^i$, and the short-term fluctuation component ($\rho^i 2$) is represented by $\tilde{\rho}^i$ $$\rho^i = \hat{\rho}^i + \tilde{\rho}^i \tag{1}$$

Thus, when the three-dimensional coordinate positions (x, y, z) of the observation point P corresponding to the installation position of the ultrasonic receiver 2 in the buoy 1 are represented by the three-dimensional coordinate positions (x1, y1, z1) of the long-term fluctuation component and the three-dimensional coordinate positions (x2, y2, z2) of the long-term fluctuation component, the following formula (2) is established.

$$\left. \begin{array}{l} x = \hat{x} + \tilde{x} \\ y = \hat{y} + \tilde{y} \\ z = \hat{z} + \tilde{z} \end{array} \right\} \tag{2}$$

Further, since the short-term fluctuation component (x2, y2, z2) is sufficiently smaller than the distance $\rho^i$ between the observation point P and the ultrasonic transmitter 3, the following formula (3) is established.

$$\begin{aligned} \rho^i &= \sqrt{(\hat{x} - x^i + \tilde{x})^2 + (\hat{y} - y^i + \tilde{y})^2 + (\hat{z} - z^i + \tilde{z})^2} \\ &\approx \sqrt{\begin{array}{l}(\hat{x} - x^i)^2 + (\hat{y} - y^i)^2 + (\hat{z} - z^i)^2 + \\ 2(\hat{x} - x^i)\tilde{x} + 2(\hat{y} - y^i)\tilde{y} + 2(\hat{z} - z^i)\tilde{z}\end{array}} \\ &\approx \hat{\rho}^i - \frac{(x^i - \hat{x})\tilde{x}}{\hat{\rho}^i} - \frac{(y^i - \hat{y})\tilde{y}}{\hat{\rho}^i} - \frac{(z^i - \hat{z})\tilde{z}}{\hat{\rho}^i} \\ &= \hat{\rho}^i - e_x^i \cdot \tilde{x} - e_y^i \cdot \tilde{y} - e_z^i \cdot \tilde{z} \end{aligned} \tag{3}$$

$(e_x^i, e_y^i, e_z^i)$ in the above formula (3) are the three-dimensional coordinate components of a vector from the observation point P to the ultrasonic transmitter 3, that is, unit vectors. As shown in FIG. 2, when the unit vectors are represented using a depression $\theta_i$ and an azimuth $\psi_i$ of the ultrasonic transmitter 3 as viewed from the observation point P, the following formula (4) is established.

$$(e_x^i, e_y^i, e_z^i) = (\cos\theta^i \cdot \sin\phi^i, \cos\theta^i \cdot \cos\phi^i, \sin\theta^i) \tag{4}$$

That is, the depression $\theta_i$ and azimuth $\psi_i$ are measured, so that $(e_x^i, e_y^i, e_z^i)$ become known factors. These angles $\theta_i$ and $\psi_i$ can be measured at the installation of the buoy 1 and the ultrasonic transmitter 3.

The following formula (5) is established based on the formulae (1), (3), and (4).

$$\begin{aligned} \tilde{\rho}^i &\approx -e_x^i \cdot \tilde{x} - e_y^i \cdot \tilde{y} - e_z^i \cdot \tilde{z} \\ &\approx -\cos\theta^i \cdot \sin\phi^i \cdot \tilde{x} - \cos\theta^i \cdot \cos\phi^i \cdot \tilde{y} - \sin\theta^i \cdot \tilde{z} \end{aligned} \tag{5}$$

Thus, three linear equations with three unknowns of the above formula (5) (i=1, 2, 3) can be obtained by the three ultrasonic transmitters 3(i). The three simultaneous linear equations with three unknowns are solved, so that the short-term fluctuation components can be obtained. Out of the three components x, y, and z in the directions of the unit vectors of the short-term fluctuation component, the z component in the vertical direction corresponds to a wave height. Specifically, the short-term fluctuation component $\rho^i 2$ can be determined between the observation point P and the ultrasonic transmitter 3 on the seabed, so that the wave height can be determined.

The distance $\rho^i$ between the observation point P and the ultrasonic transmitter 3 on the seabed can be determined by the following formula (6) wherein the propagation time of ultrasonic waves from the ultrasonic transmitter 3 to the observation point P is represented by $t^i$, and the reference sonic velocity is represented by a fixed value c (the actual sonic velocity largely changes undersea but, for example, a sonic velocity value corresponding to the temperature near the sea surface in an average year may be used).

$$\rho^i = c \times t^i \tag{6}$$

High-pass filtering suitable for the distance data $\rho^i$ expressed in the above formula (6) is performed to remove the long-term fluctuation component $\rho^i 1$, so that the short-term fluctuation component $\rho^i 2$ can be determined.

In order to detect the one-way propagation time of ultrasonic waves from the ultrasonic transmitter 3 to the ultrasonic receiver 2, as a matter of course, the ultrasonic receiver 2 can sense time at which ultrasonic waves are emitted from the ultrasonic transmitter 3. Specifically, accurate clocks are provided on the ultrasonic receiver 2 and the ultrasonic transmitter 3 such that the two clocks are synchronized. Thus, the time at which ultrasonic waves are emitted from the ultrasonic receiver 3 is known in advance.

The sea wave measuring device 4 for measuring wave heights will be described.

The sea wave measuring device 4, as shown in FIG. 3, includes: a distance calculator 11 for detecting the time $t^1$ since ultrasonic waves are emitted (transmitted) from the ultrasonic transmitter 3 until the ultrasonic waves are received by the ultrasonic receiver 2 to calculate the distance $\rho^i$ between the buoy 1 and the ultrasonic transmitter 3 based on the above formula (6); a short-term fluctuation component extraction part 12 for high-pass filtering the distance data determined by the distance calculator 11 to remove the long-term fluctuation component $\rho^i 1$ and extract the short-term fluctuation component $\rho^i 2$; an equation preparation part 13 for preparing linear equations with three unknowns for the three ultrasonic transmitters 3 based on the short-term fluctuation component $\rho^i 2$ obtained by the short-term fluctuation component extraction part 12; and an equation solution calculator 14 for solving the linear equations with three unkowns obtained by the equation preparation part 13. At least the functions of the distance calculator 11, the short-term fluctuation component extraction part 12, the equation preparation part 13, and the equation solution calculator 14 are performed by the programs thereof. As a matter of course, the constituents are incorporated into the same program as needed, but for the sake of simplicity, names expressing the functions are assigned to the constituents.

The method for measuring wave heights in the above configuration will be described.

Ultrasonic waves emitted from the ultrasonic transmitters 3 on the seabed toward the sea surface are received by the ultrasonic receiver 2 of the buoy 1 floating on the sea surface, so that the propagation time $t^i$ is detected between the ultrasonic receiver 2 and the ultrasonic transmitter 3. Thus, the distance calculator 11 determines the distance $\rho^i$ between the ultrasonic receiver 2 and the ultrasonic transmitter 3.

Next, the distance data is inputted to the short-term fluctuation component extraction part 12 to extract the short-term fluctuation component $\rho^i 2$.

The extracted short-term fluctuation component $\rho^i 2$ is inputted to the equation preparation part 13 to prepare linear equations with three unknowns for the three respective ultrasonic transmitters 3 based on the above formula (5).

The prepared simultaneous linear equations with three unknowns are inputted to the equation solution calculator 14 to determine the three unkowns x, y, and z. The z component is derived as a wave height.

As described above, in the method for measuring sea waves and the sea wave measuring system, ultrasonic waves emitted from the three ultrasonic transmitters on or in the vicinity of the seabed toward the sea surface are received by the ultrasonic receiver of the buoy below the sea surface, and the one-way propagation time of the ultrasonic waves is detected to measure the distances between the buoy and the ultrasonic transmitters. In the measurement, the measured distance data is high-pass filtered, that is, the long-term fluctuation component is removed to extract only the short-term fluctuation component not containing the influence of seawater, so that wave heights are measured. Thus, the measurement is not affected by the sea surface as compared to the related art in which wave heights are measured by transmitting ultrasonic waves from a transducer on the seabed toward the sea surface to reflect the ultrasonic waves. In other words, even when waves are high, the wave heights can be accurately measured, so that an unmeasurable state is hardly produced.

Second Embodiment

The following will describe a method for measuring sea waves using ultrasonic waves and a sea wave measuring system according to a second embodiment of the present invention.

In the first embodiment, ultrasonic waves emitted from the ultrasonic transmitters on the seabed are received by the ultrasonic receiver of the buoy to detect the one-way propagation time of the ultrasonic waves. In the second embodiment, however, ultrasonic waves emitted from the ultrasonic transmitter/receiver of a buoy are received and transmitted, that is, relayed by a transponder (sound wave relay device) on the seabed to detect the round-trip propagation time of the ultrasonic waves.

Similarly to the first embodiment, the second embodiment will be described from the beginning.

Figure 4:
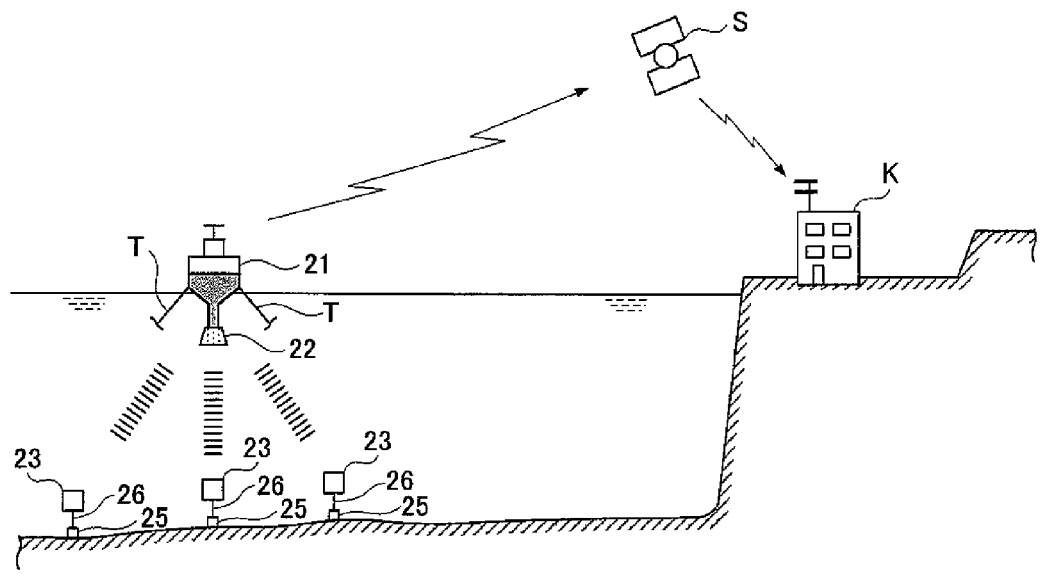
FIG. 4 schematically shows the overall configuration of a sea wave measuring system according to a second embodiment of the present invention.
Figure 5:
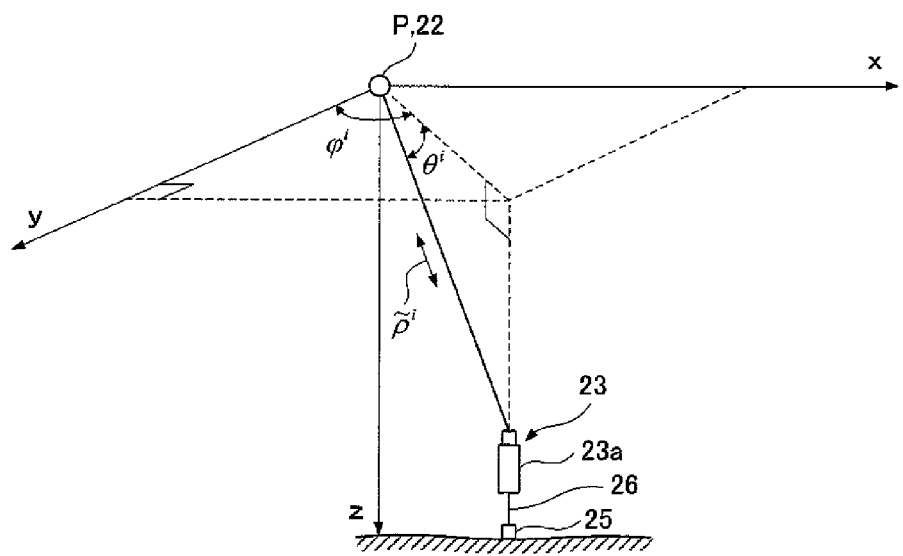
FIG. 5 is a perspective view of a coordinate system for illustrating the measurement principle of the sea wave measuring system.
Figure 6:
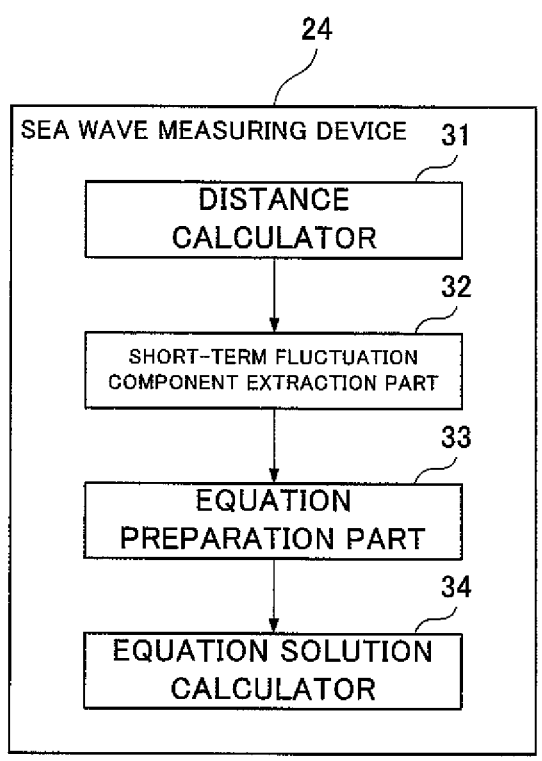
FIG. 6 is a block diagram showing the schematic configuration of a sea wave measuring device in the sea wave measuring system.

The sea wave measuring system, as shown in FIGS. 4 to 6, includes: a buoy 21 which is moored by mooring cables T, floats on the sea surface in very deep waters, and is provided with an ultrasonic transmitter/receiver 22 capable of transmitting and receiving ultrasonic waves into and from water; at least three transponders (sound wave relay devices) 23 which are placed substantially directly below the buoy 21 in the vicinity of the seabed to receive the ultrasonic waves from the ultrasonic transmitter/receiver 22 and amplify and emit (relay) the ultrasonic waves toward the sea surface; and a sea wave measuring device 24 for measuring wave heights by receiving the ultrasonic waves from the transponders 23 with the ultrasonic transmitter/receiver 22 to detect the three-dimensional position of the buoy 21. The ultrasonic transmitter/receiver 22 is provided on the lower end of the buoy 21, that is, undersea. Further, a cylindrical container body 23a of the transponder 23 includes a relay device body for receiving, amplifying, and emitting ultrasonic waves therein.

The transponders 23 are movably moored through cables 26 by, for example, anchors 25 dropped on the seabed, but may be seen to remain still, that is, fixed since there are few currents in the vicinity of the seabed in very deep waters. Further, the transponders 23 may be dropped or installed directly on the seabed.

The following will describe the sea wave measuring device 24.

The sea wave measuring device 24 measures wave heights by continuously measuring distances between the ultrasonic transmitter/receiver 22 of the buoy 21 and the three transponders 23 to detect fluctuations of the buoy 21, that is, displacements of the sea surface. The sea wave measuring device 24 can determine wave heights anywhere by means of calculations with only data of ultrasonic waves relayed by the transponder 23, the ultrasonic waves having been emitted from the ultrasonic transmitter/receiver 22. Thus, data received by the ultrasonic transmitter/receiver 22, for example, time data is transmitted to a base station K on the shore via a satellite S or the like, so that wave heights are determined by the sea wave measuring device 24 usually placed in the base station K. As a matter of course, the sea wave measuring device 24 may be placed in the buoy 21 to transmit the wave heights determined by the sea wave measuring device 24 to a predetermined place such as the base station K via the satellite S.

First, the principle for detecting wave heights using ultrasonic waves will be briefly described.

In the method for measuring wave heights using ultrasonic waves according to the present invention, the three-dimensional position of the buoy 21 floating on the sea surface is measured to measure displacements (variations) of the sea surface. In brief, displacements of the buoy 21 relative to the transponders 23 are detected. In the detection, distances between the buoy 21 and the transponders 23 are measured using ultrasonic waves. In other words, distances between the ultrasonic transmitter/receiver 22 of the buoy 21 and the transponders 23 placed on the seabed (or in the vicinity of the seabed) in very deep waters are measured using the propagation time of ultrasonic waves. The measurement is largely affected by seawater. Specifically, since the velocities of ultrasonic waves are significantly varied by the temperature, pressure, and salinity level of seawater, these fluctuation components have to be removed.

In the second embodiment, the influence by seawater is removed, noticing that the time for the change of the distributions of the temperature, pressure, and salinity level of the seawater between the ultrasonic transmitter/receiver 22 and the transponders 23 is long, in other words, the time for the change is far longer than the cycle of vertical motion of the buoy due to sea waves.

Specifically, the displacement (fluctuation) of the buoy contains a long-term fluctuation component due to the influence of seawater and a short-term fluctuation component due to sea waves. Thus, the wave height corresponding to the short-term fluctuation component can be determined by subtracting the long-term fluctuation component from the displacement of the buoy.

The steps of determining wave heights will be described below.

Herein, the installation position of the ultrasonic transmitter/receiver 22 provided in a predetermined position of the buoy 21 is referred to as an observation point P.

First, when a distance between the observation point P and the transponder 23 (i; i=1, 2, 3) is represented by $\rho^i$, the long-term fluctuation component is represented by $\rho^i 1$, and the short-term fluctuation component is represented by $\rho^i 2$, the following formula (11) is established. In the formula, the long-term fluctuation component ($\rho^i 1$) is represented by $\hat{\rho}^i$, and the short-term fluctuation component ($\rho^i 2$) is represented by if.

$$\rho^i = \hat{\rho}^i + \tilde{\rho}^i \tag{11}$$

Thus, when the three-dimensional coordinate positions (x, y, z) of the observation point P corresponding to the installation position of the ultrasonic transmitter/receiver 22 in the buoy 21 are represented by the three-dimensional coordinate positions (x1, y1, z1) of the long-term fluctuation component and the three-dimensional coordinate positions (x2, y2, z2) of the long-term fluctuation component, the following formula (12) is established.

$$\left.\begin{array}{l} x = \hat{x} + \tilde{x} \\ y = \hat{y} + \tilde{y} \\ z = \hat{z} + \tilde{z} \end{array}\right\} \tag{12}$$

Further, since the short-term fluctuation component (x2, y2, z2) is sufficiently smaller than the distance $\rho^i$ between the observation point P and the transponder 23, the following formula (13) is established.

$$\begin{aligned} \rho^i &= \sqrt{(\hat{x} - x^i + \tilde{x})^2 + (\hat{y} - y^i + \tilde{y})^2 + (\hat{z} - z^i + \tilde{z})^2} \\ &\approx \sqrt{\begin{array}{l}(\hat{x} - x^i)^2 + (\hat{y} - y^i)^2 + (\hat{z} - z^i)^2 + \\ 2(\hat{x} - x^i)\tilde{x} + 2(\hat{y} - y^i)\tilde{y} + 2(\hat{z} - z^i)\tilde{z}\end{array}} \\ &\approx \hat{\rho}^i - \frac{(x^i - \hat{x})\tilde{x}}{\hat{\rho}^i} - \frac{(y^i - \hat{y})\tilde{y}}{\hat{\rho}^i} - \frac{(z^i - \hat{z})\tilde{z}}{\hat{\rho}^i} \\ &= \hat{\rho}^i - e^i_x \cdot \tilde{x} - e^i_y \cdot \tilde{y} - e^i_z \cdot \tilde{z} \end{aligned} \tag{13}$$

$(e_x^i, e_y^i, e_z^i)$ in the above formula (13) are the three-dimensional coordinate components of a vector from the observation point P to the transponder 23, that is, unit vectors. As shown in FIG. 5, when the unit vectors are represented using a depression $\theta_i$ and an azimuth $\psi_i$ of the transponder 23 as viewed from the observation point P, the following formula (14) is established.

$$(e_x^i, e_y^i, e_x^i) = (\cos\theta^i \cdot \sin\varphi^i, \cos\theta^i \cdot \cos\varphi^i, \sin\theta^i) \tag{14}$$

That is, the depression $\theta_i$ and azimuth $\psi_i$ are measured, so that $(e_x^i, e_y^i, e_z^i)$ become known factors. These angles $\theta_i$ and $\psi_i$ can be measured at the installation of the buoy 21 and the transponder 23.

The following formula (15) is established based on the formulae (11), (13), and (14).

$$\begin{aligned} \tilde{\rho}^i &\approx -e^i_x \cdot \tilde{x} - e^i_y \cdot \tilde{y} - e^i_z \cdot \tilde{z} \\ &\approx -\cos\theta^i \cdot \sin\varphi^i \cdot \tilde{x} - \cos\theta^i \cdot \cos\varphi^i \cdot \tilde{y} - \sin\theta^i \cdot \tilde{z} \end{aligned} \tag{15}$$

Thus, three linear equations with three unknowns of the above formula (15) (i=1, 2, 3) can be obtained by the three transponders 23(i). The three simultaneous linear equations with three unknowns are solved, so that the short-term fluctuation components can be obtained. Out of the three components x, y, and z in the directions of the unit vectors of the short-term fluctuation component, the z component in the vertical direction corresponds to a wave height. Specifically, the short-term fluctuation component $\rho^i 2$ can be determined between the observation point P and the transponder 23 on the seabed, so that the wave height can be determined.

The distance $\rho^i$ between the observation point P and the transponder 23 on the seabed can be determined by the following formula (16) wherein the round-trip propagation time of ultrasonic waves emitted from the observation point P is represented by $t^i$, and the reference sonic velocity is represented by a fixed value c (the actual sonic velocity largely changes undersea but, for example, a sonic velocity value corresponding to the temperature near the sea surface in an average year may be used).

$$\rho^i = c \times t^i / 2 \tag{16}$$

High-pass filtering suitable for the distance data $\rho^i$ expressed in the above formula (16) is performed to remove the long-term fluctuation component $\rho^i 1$, so that the short-term fluctuation component $\rho^i 2$ can be determined.

The sea wave measuring device 24 for measuring wave heights will be described.

The sea wave measuring device 24, as shown in FIG. 6, includes: a distance calculator 31 for detecting the time $t^i$ until ultrasonic waves emitted (transmitted) from the buoy 21 are received via the transponder 23 to calculate the distance $\rho^i$ between the buoy 21 and the transponder 23 based on the above formula (16); a short-term fluctuation component extraction part 32 for high-pass filtering the distance data determined by the distance calculator 31 to remove the long-term fluctuation component $\rho^i 1$ and extract the short-term fluctuation component $\rho^i 2$; an equation preparation part 33 for preparing linear equations with three unkowns for the three transponders 23 based on the short-term fluctuation component $\rho^i 2$ obtained by the short-term fluctuation component extraction part 32; and an equation solution calculator 34 for solving the linear equations with three unkowns obtained by the equation preparation part 33. At least the functions of the distance calculator 31, the short-term fluctuation component extraction part 32, the equation preparation part 33, and the equation solution calculator 34 are performed by the programs thereof. As a matter of course, the constituents are incorporated into the same program as needed, but for the sake of simplicity, names expressing the functions are assigned to the constituents.

The method for measuring wave heights in the above configuration will be described.

Ultrasonic waves emitted into the water from the ultrasonic transmitter/receiver 22 of the buoy 21 floating on the sea surface are received by the transponders 23, and at the same time, the ultrasonic waves are transmitted to the sea surface (in other words, the ultrasonic waves are, relayed).

The ultrasonic waves are received by the ultrasonic transmitter/receiver 22 and the round-trip propagation time $t^i$ between the ultrasonic transmitter/receiver 22 and the transponder 23 is detected, so that the distance $\rho^i$ between the ultrasonic transmitter/receiver 22 and the transponder 23 is determined by the distance calculator 31.

Next, the distance data is inputted to the short-term fluctuation component extraction part 32, and the short-term fluctuation component $\rho^i 2$ is extracted.

The extracted short-term fluctuation component $\rho^i 2$ is inputted to the equation preparation part 33 to prepare linear equations with three unkowns for the three respective transponders 23 based on the above formula (15).

The prepared simultaneous linear equations with three unkowns are inputted to the equation solution calculator 34 to determine the three unkowns x, y, and z, and the z component is derived as a wave height.

In the method for measuring sea waves and the sea wave measuring system, ultrasonic waves are transmitted into the sea from the ultrasonic transmitter/receiver, which is provided below the sea surface, of the buoy floating on the sea surface, the ultrasonic waves from the three transponders on the seabed (or in the vicinity of the seabed) are received by the ultrasonic transmitter/receiver, and the round-trip propagation time of the ultrasonic waves is detected to measure the distances between the buoy and the transponders. In the measurement, the measured distance data is high-pass filtered, that is, the long-term fluctuation component is removed to extract only the short-term fluctuation component not containing the influence of seawater, so that wave heights are measured. Thus, the measurement is not affected by the sea surface as compared to the related art in which ultrasonic waves are transmitted from an ultrasonic transmitter/receiver on the seabed toward the sea surface and are reflected by the sea surface to measure wave heights. In other words, even when waves are high, the wave heights can be accurately measured, so that an unmeasurable state is hardly produced.

Third Embodiment

The following will describe a method for measuring sea waves using ultrasonic waves and a sea wave measuring system according to a third embodiment of the present invention.

In the second embodiment, ultrasonic waves emitted from the ultrasonic transmitter/receiver of the buoy which is provided below the sea surface are received and emitted, that is, relayed by the transponder (sound wave relay device) placed in the vicinity of the seabed to detect the round-trip propagation time of the relayed ultrasonic waves. In the third embodiment, however, the one-way propagation time of ultrasonic waves relayed by a transponder is detected.

Similarly to the second embodiment, the third embodiment will be also described from the beginning.

Figure 7:
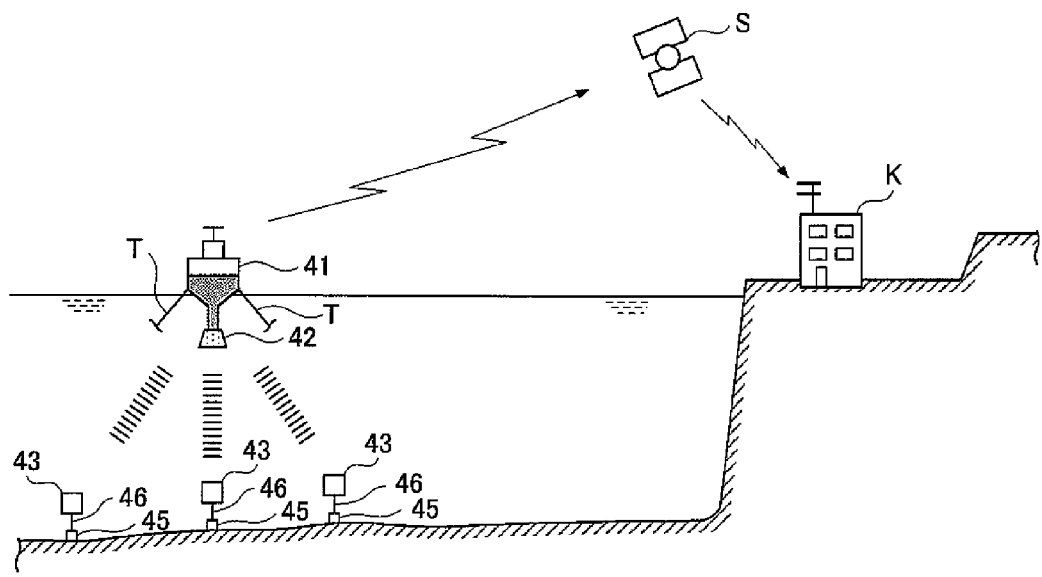
FIG. 7 schematically shows the overall configuration of a sea wave measuring system according to a third embodiment of the present invention.
Figure 8:
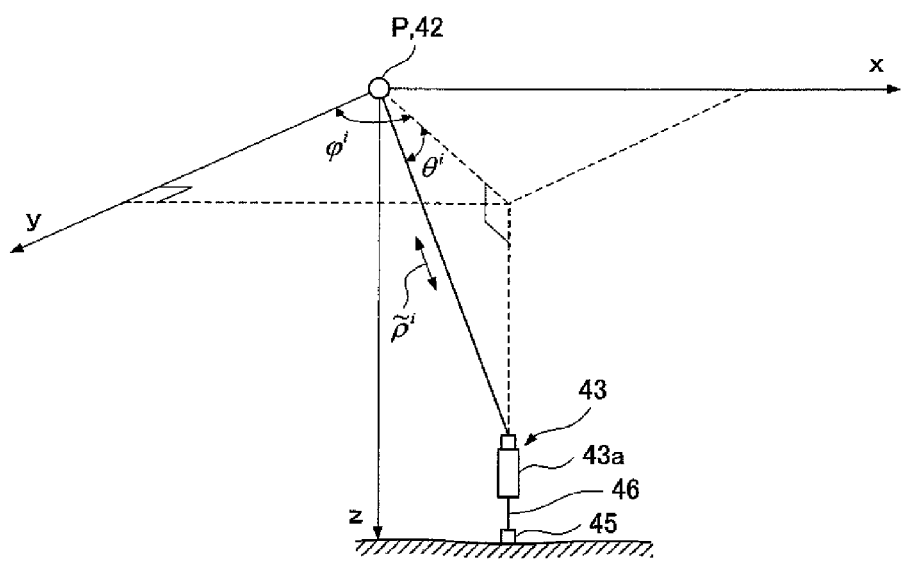
FIG. 8 is a perspective view of a coordinate system for illustrating the measurement principle of the sea wave measuring system.
Figure 9:
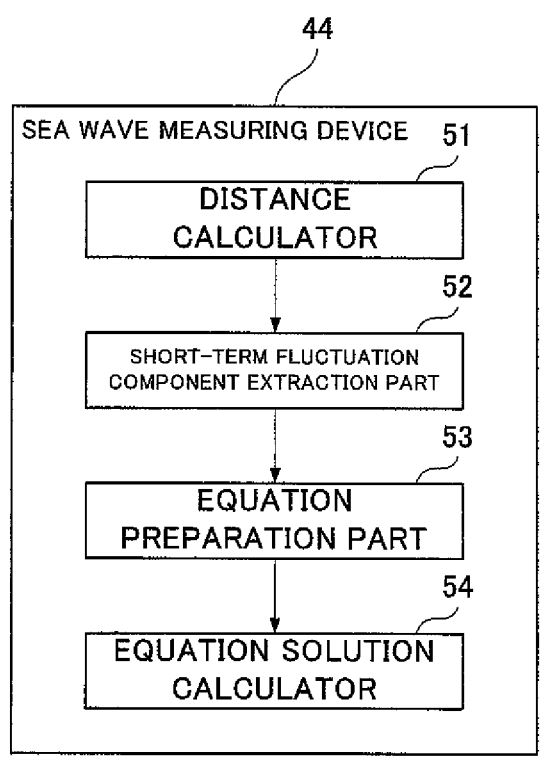
FIG. 9 is a block diagram showing the schematic configuration of a sea wave measuring device in the sea wave measuring system.

The sea wave measuring system, as shown in FIGS. 7 to 9, includes: a buoy 41 which is moored by mooring cables T, floats on the sea surface in very deep waters, and is provided with an ultrasonic transmitter/receiver 42 capable of transmitting and receiving ultrasonic waves into and from water; at least three transponders (sound wave relay devices) 43 which are placed substantially directly below the buoy 41 in the vicinity of the seabed to receive the ultrasonic waves from the ultrasonic transmitter/receiver 42 and amplify and emit (relay) the ultrasonic waves toward the sea surface; and a sea wave measuring device 44 for measuring wave heights by receiving the ultrasonic waves from the transponders 43 with the ultrasonic transmitter/receiver 42 to detect the three-dimensional position of the buoy 41. The ultrasonic transmitter/receiver 42 is provided on the lower end of the buoy 41, that is, undersea. Further, a cylindrical container body 43a of the transponder 43 includes a relay device body for receiving, amplifying, and emitting ultrasonic waves therein.

The transponders 43 are provided with accurate clocks. Ultrasonic waves are received and emitted with a signal of the time of emission (also referred to as the time of relay). The ultrasonic transmitter/receiver 42 is also provided with a clock in synchronization with the clock of the transponder 43 (the two clocks agree), so that the one-way propagation time from the emission to receipt of ultrasonic waves can be detected.

The transponders 43 are movably moored through cables 46 by, for example, anchors 45 dropped on the seabed, but may be seen to remain still, that is, fixed since there are few currents in the vicinity of the seabed in very deep waters. Further, the transponders 43 may be dropped or installed directly on the seabed.

The following will describe the sea wave measuring device 44.

The sea wave measuring device 44 detects fluctuations of the buoy 41, that is, displacements of the sea surface by continuously measuring distances between the buoy 41 and the three transponders 43. The sea wave measuring device 44 can determine wave heights anywhere by means of calculations with only data of ultrasonic waves relayed by the transponder 43, the ultrasonic waves having been emitted from the ultrasonic transmitter/receiver 42. Thus, data received by the ultrasonic transmitter/receiver 42, for example, time data is transmitted to a base station K on the shore via a satellite S or the like, so that wave heights are determined by the sea wave measuring device 44 usually placed in the base station K. As a matter of course, the sea wave measuring device 44 may be placed in the buoy 41 to transmit the wave heights determined by the sea wave measuring device 44 to a predetermined place such as the base station K via the satellite S.

First, the principle for detecting wave heights using ultrasonic waves will be briefly described.

In the method for measuring wave heights using ultrasonic waves according to the present invention, the three-dimensional position of the buoy 41 floating on the sea surface is measured to measure displacements (variations) of the sea surface. In brief, displacements of the buoy 41 relative to the transponders 43 are detected. In the detection, distances between the buoy 41 and the transponders 43 are measured using ultrasonic waves. In other words, distances between the ultrasonic transmitter/receiver 42 of the buoy 41 and the transponders 43 placed on the seabed (or in the vicinity of the seabed) in very deep waters are measured using the propagation time of ultrasonic waves. The measurement is largely affected by seawater. Specifically, since the velocities of ultrasonic waves are significantly varied by the temperature, pressure, and salinity level of seawater, these fluctuation components have to be removed.

In the third embodiment, the influence by seawater is removed, noticing that the time for the change of the distributions of the temperature, pressure, and salinity level of seawater between the ultrasonic transmitter/receiver 42 and the transponders 43 is long, in other words, the time for the change is far longer than the cycle of vertical motion of the buoy due to sea waves.

Specifically, the displacement (fluctuation) of the buoy contains a long-term fluctuation component due to the influence of seawater and a short-term fluctuation component due to sea waves. Thus, the wave height corresponding to the short-term fluctuation component can be determined by subtracting the long-term fluctuation component from the displacement of the buoy.

The steps of determining wave heights will be described below.

Herein, the installation position of the ultrasonic transmitter/receiver 42 provided in a predetermined position of the buoy 41 is referred to as an observation point P.

First, when a distance between the observation point P and the transponder 43 (i; i=1, 2, 3) is represented by $\rho^i$, the long-term fluctuation component is represented by $\rho^i 1$, and the short-term fluctuation component is represented by $\rho^i 2$, the following formula (21) is established. In the formula, the long-term fluctuation component ($\rho^i 1$) is represented by $\hat{\rho}^i$, and the short-term fluctuation component ($\rho^i 2$) is represented by $\tilde{\rho}^i$.

$$\rho^i = \hat{\rho}^i + \tilde{\rho}^i \quad (21)$$

Thus, when the three-dimensional coordinate positions (x, y, z) of the observation point P corresponding to the installation position of the ultrasonic transmitter/receiver 42 in the buoy 41 are represented by the three-dimensional coordinate positions (x1, y1, z1) of the long-term fluctuation component and the three-dimensional coordinate positions (x2, y2, z2) of the long-term fluctuation component, the following formula (22) is established.

$$\left.\begin{array}{l} x = \hat{x} + \tilde{x} \\ y = \hat{y} + \tilde{y} \\ z = \hat{z} + \tilde{z} \end{array}\right\} \quad (22)$$

Further, since the short-term fluctuation component (x2, y2, z2) is sufficiently smaller than the distance $\rho^i$ between the observation point P and the transponder 23, the following formula (23) is established.

$$\begin{aligned} \rho^i &= \sqrt{(\hat{x} - x^i + \tilde{x})^2 + (\hat{y} - y^i + \tilde{y})^2 + (\hat{z} - z^i + \tilde{z})^2} \\ &\approx \sqrt{\begin{array}{l}(\hat{x} - x^i)^2 + (\hat{y} - y^i)^2 + (\hat{z} - z^i)^2 + \\ 2(\hat{x} - x^i)\tilde{x} + 2(\hat{y} - y^i)\tilde{y} + 2(\hat{z} - z^i)\tilde{z}\end{array}} \\ &\approx \hat{\rho}^i - \frac{(x^i - \hat{x})\tilde{x}}{\hat{\rho}^i} - \frac{(y^i - \hat{y})\tilde{y}}{\hat{\rho}^i} - \frac{(z^i - \hat{z})\tilde{z}}{\hat{\rho}^i} \\ &= \hat{\rho}^i - e^i_x \cdot \tilde{x} - e^i_y \cdot \tilde{y} - e^i_z \cdot \tilde{z} \end{aligned} \quad (23)$$

($e^i_x$, $e^i_y$, $e^i_z$) in the above formula (23) are the three-dimensional coordinate components of a vector from the observation point P to the transponder 43, that is, unit vectors. As shown in FIG. 8, when the unit vectors are represented using a depression $\theta_i$ and an azimuth $\psi_i$ of the transponder 43 as viewed from the observation point P, the following formula (24) is established.

$$(e^i_x, e^i_y, e^i_z) = (\cos\theta^i \cdot \sin\varphi^i, \cos\theta^i \cdot \cos\varphi^i, \sin\theta^i) \quad (24)$$

That is, the depression $\theta_i$ and azimuth $\psi_i$ are measured, so that ($e^i_x$, $e^i_y$, $e^i_z$) become known factors. These angles $\theta_i$ and $\psi_i$ can be measured at the installation of the buoy 41 and the transponder 43.

The following formula (25) is established based on the formulae (21), (23), and (24).

$$\begin{aligned} \tilde{\rho}^i &\approx -e^i_x \cdot \tilde{x} - e^i_y \cdot \tilde{y} - e^i_z \cdot \tilde{z} \\ &\approx -\cos\theta^i \cdot \sin\varphi^i \cdot \tilde{x} - \cos\theta^i \cdot \cos\varphi^i \cdot \tilde{y} - \sin\theta^i \cdot \tilde{z} \end{aligned} \quad (25)$$

Thus, three linear equations with three unknowns of the above formula (25) (i=1, 2, 3) can be obtained by the three transponders 43(i). The three simultaneous linear equations with three unknowns are solved, so that the short-term fluctuation components can be obtained. Out of the three components x, y, and z in the directions of the unit vectors of the short-term fluctuation component, the z component in the vertical direction corresponds to a wave height. Specifically, the short-term fluctuation component $\rho^i 2$ can be determined between the observation point P and the transponder 43 on the seabed, so that the wave height can be determined.

The distance $\rho^i$ between the observation point P and the transponder 43 on the seabed can be determined by the following formula (26) wherein the one-way propagation time of ultrasonic waves emitted from the transponder 43 to the observation point P is represented by $t^i$, and the reference sonic velocity is represented by a fixed value c (the actual sonic velocity largely changes undersea but, for example, a sonic velocity value corresponding to the temperature near the sea surface in an average year may be used).

$$\rho^i = c \times t^i \quad (26)$$

High-pass filtering suitable for the distance data $\rho^i$ expressed in the above formula (26) is performed to remove the long-term fluctuation component $\rho^i 1$, so that the short-term fluctuation component $\rho^i 2$ can be determined.

The sea wave measuring device 44 for measuring wave heights will be described.

The sea wave measuring device 44, as shown in FIG. 9, includes: a distance calculator 51; a short-term fluctuation component extraction part 52; an equation preparation part 53; and an equation solution calculator 54. The distance calculator 51 calculates the distance $\rho^i$ between the buoy 41 and the transponder 43 based on the above formula (26) by receiving, amplifying, and emitting ultrasonic waves emitted (transmitted) from the buoy 41 with the transponder 43, receiving the ultrasonic waves together with the signal of the time of emission with the ultrasonic transmitter/receiver 42, and detecting the one-way propagation time $t^i$ from the transponder 43 to the observation point P. The short-term fluctuation component extraction part 52 extracts the short-term fluctuation component $\rho^i 2$ by high-pass filtering the distance data determined by the distance calculator 51 to remove the long-term fluctuation component $\rho^i 1$. The equation preparation part 53 prepares linear equations with three unkowns for the three transponders 43 based on the short-term fluctuation component $\rho^i 2$ obtained by the short-term fluctuation component extraction part 52. The equation solution calculator 54 solves the simultaneous linear equations with three unkowns obtained by the equation preparation unit 53. At least the functions of the distance calculator 51, the short-term fluctuation component extraction part 52, the equation preparation part 53, and the equation solution calculator 54 are performed by the programs thereof. As a matter of course, the constituents are incorporated into the same program as needed, but for the sake of simplicity, names expressing the functions are assigned to the constituents.

The method for measuring wave heights in the above configuration will be described.

Ultrasonic waves emitted into the water from the ultrasonic transmitter/receiver 42 of the buoy 41 floating on the sea surface are received by the transponders 43, and at the same time, the ultrasonic waves and the signal of the time of emission are emitted from the transponders 43 toward the sea surface.

The ultrasonic waves are received by the ultrasonic transmitter/receiver 42 and the one-way propagation time $t^i$ between the transponder 43 and the ultrasonic transmitter/receiver 42 is detected, so that the distance $\rho^i$ between the ultrasonic transmitter/receiver 42 and the transponder 43 is determined by the distance calculator 51.

Next, the distance data is inputted to the short-term fluctuation component extraction part 52, and the short-term fluctuation component $\rho^i 2$ is extracted.

The extracted short-term fluctuation component $\rho^i 2$ is inputted to the equation preparation part 53 to prepare linear equations with three unkowns for the three respective transponders 43 based on the above formula (25).

The prepared simultaneous linear equations with three unkowns are inputted to the equation solution calculator 54 to determine the three unkowns x, y, and z, and the z component is derived as a wave height.

In the method for measuring sea waves and the sea wave measuring system, ultrasonic waves are transmitted into the sea from the ultrasonic transmitter/receiver, which is provided below the sea surface, of the buoy floating on the sea surface, the ultrasonic waves from the three transponders on the seabed (or in the vicinity of the seabed) are received with the time of emission by the ultrasonic transmitter/receiver of the buoy, and the one-way propagation time of the ultrasonic waves is detected to measure the distances between the buoy and the transponders. In the measurement, the measured distance data is high-pass filtered, that is, the long-term fluctuation component is removed to extract only the short-term fluctuation component not containing the influence of seawater, so that wave heights are measured. Thus, the measurement is not affected by the sea surface as compared to the related art in which ultrasonic waves are transmitted from an ultrasonic transmitter/receiver on the seabed toward the sea surface and are reflected by the sea surface to measure wave heights. In other words, even when waves are high, the wave heights can be accurately measured, so that an unmeasurable state is hardly produced.

In the above-described embodiments, three ultrasonic transmitters or transponders are provided. However, when at least four ultrasonic transmitters or transponders can be installed, the least-squares method can be applied, so that the coordinate values of the short-term fluctuation component, that is, wave heights can be highly reliably measured.

Industrial Applicability

In the method for measuring sea waves and the sea wave measuring system according to the present invention, the propagation time of ultrasonic waves between the buoy moored on the sea surface and the transponder installed on the seabed is measured, so that sea waves can be accurately measured. Thus, sea waves can be easily measured even in waters far away from the coast.

The invention claimed is:

1. A method for measuring sea waves by means of ultrasonic waves, for measuring wave heights in predetermined waters by detecting a fluctuation of a floating body on a sea surface, the method comprising:
   receiving ultrasonic waves emitted from at least three ultrasonic transmitters on or in the vicinity of a seabed below the floating body moored on the sea surface of the predetermined waters with an ultrasonic receiver provided below the sea surface on the floating body;
   detecting distances between the ultrasonic transmitters and the ultrasonic receiver based on propagation time since the ultrasonic waves are emitted from the ultrasonic transmitters until the ultrasonic waves are received;
   high-pass filtering the distance data to extract short-term fluctuation components; and
   preparing linear equations with three unknowns for the respective ultrasonic transmitters such that the extracted short-term fluctuation component is equal to the displacement of the ultrasonic receiver and the displacement of the ultrasonic receiver is represented by three unknowns (x, y, z) on the three-dimensional coordinate axes, and solving the simultaneous linear equations with three unknowns to determine at least the displacement in a height direction of the short-term fluctuation component and obtain a wave height wherein the wave height is a component of the short-term fluctuation component.

2. A sea wave measuring system by means of ultrasonic waves for measuring sea waves in predetermined waters by detecting a fluctuation of a floating body on a sea surface, the system comprising:
   the floating body moored on the sea surface in the predetermined waters;
   ultrasonic transmitters placed in at least three positions on or in the vicinity of a seabed below the floating body;
   an ultrasonic receiver capable of receiving ultrasonic waves from the ultrasonic transmitters, the ultrasonic receiver being provided below the sea surface on the floating body; and
   a sea wave measuring device for measuring wave heights by detecting distances between the ultrasonic transmitters and the ultrasonic receiver based on propagation time since the ultrasonic waves are emitted from the ultrasonic transmitters until the ultrasonic waves are received, wherein the sea wave measuring device comprises:
   a distance calculator for calculating the distances between the ultrasonic transmitters and the ultrasonic receiver based on the propagation time since the ultrasonic waves are emitted from the ultrasonic transmitters until the ultrasonic waves are received;
   a short-term fluctuation component extraction part for extracting short-term fluctuation components by high-pass filtering the distance data determined by the distance calculator; and
   a short-term fluctuation component calculator for preparing linear equations with three unknowns for the respective ultrasonic transmitters such that the short-term fluctuation component extracted by the short-term fluctuation component extraction part is equal to the displacement of the ultrasonic receiver and the displacement of the ultrasonic receiver is represented by three unknowns (x, y, z) on the three-dimensional coordinate axes, and solving the linear equations with three unknowns to determine at least the displacement in a height direction of the short-term fluctuation component and obtain a wave height wherein the wave height is a component of the short-term fluctuation component.

3. A method for measuring sea waves by means of ultrasonic waves, for measuring wave heights in predetermined waters by detecting a fluctuation of a floating body on a sea surface, the method comprising:
   emitting ultrasonic waves into a sea from an ultrasonic transmitter/receiver provided below the sea surface on the floating body moored on the sea surface in the predetermined waters, and receiving the ultrasonic waves from at least three sound wave relay devices placed on or in the vicinity of a seabed below the floating body;

detecting distances between the sound wave relay devices and the ultrasonic transmitter/receiver based on round-trip propagation time since the ultrasonic waves are emitted from the ultrasonic transmitter/receiver until the ultrasonic waves are received;

high-pass filtering the distance data to extract short-term fluctuation components; and preparing linear equations with three unknowns for the respective sound wave relay devices such that the extracted short-term fluctuation component is equal to the displacement of the ultrasonic transmitter/receiver and the displacement of the ultrasonic transmitter/receiver is represented b three unknowns (x, y, z) on the three-dimensional coordinate axes, and solving the linear equations with three unknowns to determine at least the displacement in a height direction of the short-term fluctuation component and obtain a wave height wherein the wave height is a component of the short-term fluctuation component.

4. A sea wave measuring system by means of ultrasonic waves for measuring sea waves in predetermined waters by detecting a fluctuation of a floating body on a sea surface, the system comprising:

the floating body moored on the sea surface in the predetermined waters;

an ultrasonic transmitter/receiver capable of emitting and receiving ultrasonic waves into and from a sea, the ultrasonic transmitter/receiver being provided below the sea surface on the floating body;

at least three sound wave relay devices for receiving and emitting the ultrasonic waves from the ultrasonic transmitter/receiver, the sound wave relay devices being placed on or in the vicinity of a seabed below the floating body; and a sea wave measuring device for measuring wave heights by detecting distances between the sound wave relay devices and the ultrasonic transmitter/receiver based on round-trip propagation time since the ultrasonic waves are emitted from the ultrasonic transmitter/receiver until the ultrasonic waves are received, wherein the sea wave measuring device comprises:

a distance calculator for calculating the distances between the sound wave relay devices and the ultrasonic transmitter/receiver based on the round-trip propagation time since the ultrasonic waves are emitted from the ultrasonic transmitter/receiver until the ultrasonic waves are received;

a short-term fluctuation component extraction part for extracting short-term fluctuation components by high-pass filtering the distance data determined by the distance calculator; and a short-term fluctuation component calculator for preparing linear equations with three unknowns for the respective sound wave relay devices such that the extracted short-term fluctuation component is equal to the displacement of the ultrasonic transmitter/receiver and the displacement of the ultrasonic transmitter/receiver is represented three unknowns (x, y. z) on the three-dimensional coordinate axes and solving the linear equations with three unknowns to determine at least the displacement in a height direction of the short-term fluctuation component and obtain a wave height wherein the wave height is a component of the short-term fluctuation component.

5. A method for measuring sea waves by means of ultrasonic waves, for measuring wave heights in predetermined waters by detecting a fluctuation of a floating body on a sea surface, the method comprising:

emitting ultrasonic waves from an ultrasonic transmitter/receiver provided below the sea surface on the floating body moored on the sea surface in the predetermined waters to at least three sound wave relay devices placed on or in the vicinity of a seabed below the floating body;

detecting distances between the sound wave relay devices and the ultrasonic transmitter/receiver based on propagation time from the sound wave relay device by receiving the ultrasonic waves relayed by the sound wave relay device and relay time with the ultrasonic transmitter/receiver;

high-pass filtering the distance data to extract short-term fluctuation components; and preparing linear equations with three unknowns for the respective sound wave relay devices such that the extracted short-term fluctuation component is equal to the displacement of the ultrasonic transmitter/receiver and the displacement of the ultrasonic transmitter:/receiver is represented by three unknowns (x, y, z) on the three-dimensional coordinate axes, and solving the linear equations with three unknowns to determine at least the displacement in a height direction of the short-term fluctuation component and obtain a wave height wherein the wave height is a component of the short--term fluctuation component.

6. A sea wave measuring system by means of ultrasonic waves for measuring sea waves in predetermined waters by detecting a fluctuation of a floating body moored on a sea surface, the system comprising:

the floating body moored on the sea surface in the predetermined waters;

an ultrasonic transmitter/receiver capable of emitting and receiving ultrasonic waves into and from a sea, the ultrasonic transmitter/receiver being provided below the sea surface on the floating body;

at least three sound wave relay devices for relaying the ultrasonic waves from the ultrasonic transmitter/receiver and emitting the ultrasonic waves with relay time, the sound wave relay devices being placed below the floating body below the sea surface; and a sea wave measuring device for measuring wave heights by detecting distances between the sound wave relay devices and the ultrasonic transmitter/receiver based on propagation time since the ultrasonic waves are emitted from the sound wave relay device until the ultrasonic waves are received, wherein the sea wave measuring device comprises:

a distance calculator for determining the distances between the sound wave relay devices and the ultrasonic transmitter/receiver based on the propagation time from the sound wave relay device by receiving the ultrasonic waves from the sound wave relay device and the relay time;

a short-term fluctuation component extraction part for extracting short-term fluctuation components by high-pass filtering the distance data determined by the distance calculator; and a short-term fluctuation component calculator for preparing linear equations with three unknowns for the respective sound wave relay devices such that the extracted short-term fluctuation component is equal to the displacement of the ultrasonic transmitter/receiver and the displacement of the ultrasonic transmitter/receiver is represented by three unknowns (x, y, z) on the three-dimensional coordinate axes, and solving the linear equations with three unknowns to determine at least the displacement in a height direction of the short-term fluctuation component and obtain a wave height wherein the wave height is a component of the short-term fluctuation component.

* * * * *